United States Patent
Hund et al.

(10) Patent No.: US 8,281,524 B2
(45) Date of Patent: Oct. 9, 2012

(54) STACKABLE FLAT-ROOF/GROUND FRAMEWORK FOR SOLAR PANELS

(75) Inventors: Markus Hund, Euskirchen (DE); Olaf Jacob, Lohmar (DE)

(73) Assignee: Solarworld AG (DE)

( * ) Notice: Subject to any disclaimer, the term of this patent is extended or adjusted under 35 U.S.C. 154(b) by 238 days.

(21) Appl. No.: 12/679,148

(22) PCT Filed: Sep. 22, 2008

(86) PCT No.: PCT/EP2008/007998
§ 371 (c)(1),
(2), (4) Date: Aug. 31, 2010

(87) PCT Pub. No.: WO2009/040081
PCT Pub. Date: Apr. 2, 2009

(65) Prior Publication Data
US 2011/0197944 A1    Aug. 18, 2011

(30) Foreign Application Priority Data
Sep. 24, 2007 (DE) .......................... 10 2007 045 554

(51) Int. Cl.
*E04D 13/18* (2006.01)
*E04H 14/00* (2006.01)
(52) U.S. Cl. ................... 52/173.3; 248/175; 248/249
(58) Field of Classification Search ............ 52/173.3; 248/175, 249, 346.01, 302, 237; 220/636, 220/631; 211/133.5, 133.2
See application file for complete search history.

(56) References Cited

U.S. PATENT DOCUMENTS

| 4,077,522 | A | * | 3/1978 | Trubiano | 211/175 |
| 5,038,943 | A | * | 8/1991 | Reinke | 211/59.1 |
| 5,314,080 | A | * | 5/1994 | Wentworth | 211/181.1 |
| 5,769,068 | A |   | 6/1998 | Takahashi | |
| 6,105,316 | A | * | 8/2000 | Bottger et al. | 52/173.3 |
| 6,398,045 | B1 | * | 6/2002 | Chao | 211/181.1 |
| 7,959,019 | B2 | * | 6/2011 | Jette | 211/117 |
| 2012/0031469 | A1 | * | 2/2012 | Loois et al. | 136/251 |

FOREIGN PATENT DOCUMENTS

| CH | 695106 A5 | 12/2005 |
| DE | 10202115 A1 | 4/2006 |
| JP | 3-200376 A | 9/1991 |
| JP | 10-331167 A | 12/1998 |

(Continued)

OTHER PUBLICATIONS

English Abstract of German Patent Publication No. 102 02 115, published Sep. 5, 2002.

(Continued)

*Primary Examiner* — Brian Glessner
*Assistant Examiner* — Paola Agudelo
(74) *Attorney, Agent, or Firm* — Cantor Colburn LLP (57) ABSTRACT

A stackable flat-roof/ground framework (1) for solar panels, comprising a sloping desk-like supporting region (2, 5, 6) for the solar panel, at least said supporting region (2, 5, 6) being implemented as a wire grate, wherein the supporting region of the flat-roof/ground framework has downwardly angled elements on two opposite edges, one element, used as rear wall (3), being designed to be longer and one element, used a front wall (4), being designed to be shorter, and having weightable panel-like base regions (2, 5, 6), said base regions (2, 5, 6) being angled from the rear wall (3) and/or the front wall (4).

22 Claims, 7 Drawing Sheets

FOREIGN PATENT DOCUMENTS

JP          2004-71805 A      3/2004

OTHER PUBLICATIONS

English Abstract of Japanese Patent Publication No. 10-331167, published Dec. 15, 1998.
English Abstract of Japanese Patent Publication No. 2004-71805, published Mar. 4, 2004.
English Abstract of Japanese Patent Publication No. 3-200376, published Sep. 2, 1991.
International Search Report for PCT/EP2008/007998, international filing date of Sep. 22, 2008, 3 pages.
Written Opinion for PCT/EP2008/007998, international filing date of Sep. 22, 2008, 8 pages.
International Preliminary Report on Patentability for PCT/EP2008/007998, international filing date of Sep. 22, 2008, 10 pages.

* cited by examiner

STACKABLE FLAT-ROOF/GROUND FRAMEWORK FOR SOLAR PANELS

CROSS-REFERENCE TO RELATED APPLICATIONS

This application is a U.S. national stage application of International Application No. PCT/EP2008/007998, which claims priority to German patent application number DE 10 2007 045 554.4, filed Sep. 24, 2007, incorporated by reference herein in its entirety.

BACKGROUND OF THE INVENTION

1. Field of the Invention

The invention relates to a stackable flat-roof/ground framework for solar panels, comprising a sloping desk-like supporting region for the solar panel and weightable panel-like base regions.

2. Description of Related Art

In the last few years, the general interest as well as the investment volume in alternative energies, and here especially in the field of solar energy, have increased largely. The generation of solar energy necessitates a solar energy plant comprising a large number of solar modules and solar panels, respectively. The technical design and the mode of operation of such solar panels are known to a sufficient extent. Normally, such solar panels are implemented as panel-like elements and are stationarily or movably mounted preferably on roofs or on standalone frameworklike mounting devices.

In this connection, supporting structures are known, which consist of a carrier having a triangular or a trapezoidal cross-section, the solar panels being arranged on the surface that is inclined relative to the roof or ground plane.

DE 8102069 U1 describes a holder for a solar skin. The device used for receiving the solar skin thereon consists here in a very simple manner of a wire frame which may be made of round bars or sectional steel.

In addition, U.S. Pat. No. 5,769,068 describes an apparatus for supporting a solar collector unit, comprising a carrier which consists of a wire net and which is held between support elements at both ends thereof.

DE69815168 T2 discloses a device for supporting one or a plurality of solar panels and/or thermal collectors, which can be arranged on a flat roof, said device having a trough-like structural design, comprising a bottom wall, a rear wall and a front wall which extend upwards from the bottom wall, and two intermediate, oppositely arranged side walls. In the condition of use, this trough-like device is preferably arranged such that the bottom wall faces downwards, weights are arranged on the bottom wall and, subsequently, this open structure is closed by the solar panel. The device described is made of plastic, i.e. of a material which is strongly influenced by the ambient atmospheric conditions and in which cracks and fissures may form due to intensive solar radiation in the summer months or due to particularly cold temperatures in the winter months.

BRIEF SUMMARY OF THE INVENTION

Taking into account that the solar panels are very expensive to produce, the danger of damage that may be caused to the solar panels by breaking carriers is an undesirable risk.

Particular characteristics of the known frameworks for solar panels are that the frameworks are very complicated to produce and that it is difficult and time-consuming to mount the solar panels on the frameworks and the frameworks on the desired substrate.

It is therefore an object of the present invention to provide a flat-roof/ground framework for solar panels which is, on the one hand, characterized by a particularly simple structural design and fastening possibilities, and which is, on the other hand, also weather-resistant and additionally characterized by the lowest possible manufacturing costs.

For a stackable flat-roof/ground framework for solar panels, comprising at least one sloping desk-like supporting region for the solar panel, said at least one said supporting region being implemented as a wire grate, this object is achieved by the features that the at least one supporting region of the flat-roof/ground framework has angled elements on two opposite edges, one element, used as rear wall, being designed to be longer and one element, used a front wall, being designed to be shorter, and that at least one weightable panel-like base region is provided, said base region being angled from the rear wall and/or the front wall.

The fact that the framework is implemented through a wire grate provides a very light construction which can be arranged in situ by the mounting personnel without great effort, in particular without any additional expensive equipment being required. In addition, the solar panel can be fixed to the wire grate safely and firmly. The special structural design of the wire grate allows fixing of a great variety of solar panels, especially of different sizes and shapes of solar panels, without the necessity of modifying the framework as such. In view of the fact that the framework is stackable, an optimum utilization of storage space will be accomplished, and the on-site transport cost can be reduced as well. Depending on the nature of the substrate on which the flat-roof/ground framework is to be established, the flat-roof/ground framework can be fixed by weighting plates, either centrally or laterally.

Furthermore, the sloping shape of the desk-like supporting region is accomplished with the aid of simple means. The areas subjected to climatic influences are as small as possible in the case of the present embodiment and sufficient stabilization is provided.

According to a preferred embodiment, the base region can extend between the front wall and the rear wall. This embodiment is so conceived that the solar panel is carried by two supporting region sections, the respective sections being angled from the front wall and from the rear wall such that they extend in directions facing away from one another. In addition, a large base region is provided as a base, which is located between the front wall and the rear wall and which can be weighted. Making use of a suitable embodiment, it is possible to optimally utilize the area available on the substrate, since the solar panel itself extends beyond the base region on both sides.

According to another preferred embodiment, the supporting region can extend between the front wall and the rear wall. In the case of this embodiment, the solar panel is mounted on the supporting region extending between the front wall and the rear wall. The flat-roof/ground framework having the solar panel mounted thereon can be arranged at the desired position and can then be fixed at this position. This fixing is executed through the arrangement of base elements, which are arranged on the panel-like base regions extending, on both sides, from the front wall and/or the rear wall and beyond the supporting region.

According to a preferred embodiment, the wire grate can be made of wire rods which extend at right angles to one another and which are joined by welding at the points of intersection. A particularly good stabilization of the wire grate will be achieved in this way, so that not even a great variety of climatic influences will impair the framework and thus lead to possible damage of the solar panel.

According to another preferred embodiment, the wire can consist of an aluminum zinc wire, in particular of Bezinal®. This kind of wire proved to be particularly stable and weather-resistant in practice, and especially the wire sold by Bekaert under the trade name "Bezinal" proved to be particularly useful. This wire is a zinc aluminum wire with a Zn content of 95% and an Al content of 5% and with an iron core. This kind of wire is extremely corrosion-resistant and is therefore particularly suitable for open air use, where the framework will be exposed to all kind of climatic influences.

Furthermore, the framework can be so conceived that the distances between the individual horizontal wires and/or the individual vertical wires are substantially identical.

According to another preferred embodiment, the vertical wires can be spaced more closely in the area of the lateral edges. The lateral areas are additionally stabilized in this way.

In this respect, it may prove to be useful when, in the area of the front wall, the horizontal wires are more closely spaced than the horizontal wires in the area of the rear wall or in the supporting region. The front wall is additionally stabilized in this way.

According to another preferred embodiment, the base regions can extend from the rear wall and/or the front wall. In view of the fact that the base regions are arranged outside of the supporting region, they are easily accessible and complicated measures for additionally weighting said base regions can be dispensed with. In addition, the solar panels can already be secured in position on the framework and the weighting of the thus finished framework can be executed only after said framework has been established on site.

According to an advantageous embodiment, the front wall and the rear wall can be interconnected through connection elements provided with engagement elements on both sides. The respective connection elements can be used for additionally fixing the distance between the front wall and the rear wall and for stabilizing said walls. It is thus possible to increase the stiffness of the framework in its entirety.

According to an advantageous embodiment, the connection element can be made of a wire which is provided with hooks or suitably bent at the end portions thereof. As regards the wire, that which has been stated hereinbefore applies. The wire used as a connection element represents hardly any surface that is exposed to wind, so that it is here only the stabilizing function that is in the foreground, without any drawbacks for the framework as such being entailed.

According to another preferred embodiment, an additional wind deflector can be provided on the rear wall.

In accordance with another preferred embodiment, the angle of inclination of the supporting surface can be an angle between 15 and 65°, preferably between 25 and 30°. An optimum mode of arrangement of the solar panel will be achieved in this way.

According to another preferred embodiment, the solar panels can be fixed to the framework via spring clips. The provision of spring clips allows a great flexibility with respect to the fixing, since, due to the use of spring clips having various sizes, solar panels having a great variety of shapes and sizes can be fixed to a uniform framework.

A spring element of the type in question can be made of an elongate wire strip, said wire strip having formed thereon a respective hook element at its opposed ends on the sides facing away from one another. The provision of such a spring element allows a great flexibility with respect to the fixing of the solar panel, so that certain minor movements of the solar panel can take place without causing any tension in the panel.

According to an advantageous embodiment, the width of the spring element can correspond to the distance between two neighbouring vertical wire rods. This has the effect that the spring element will be fixed by the vertical wire rods and secured against displacement.

In accordance with an advantageous embodiment, each solar panel can be fixed to the framework via screws. The use of screws represents a very simple and fast possibility of fixing, which does not necessitate any additional structures.

BRIEF DESCRIPTION OF THE SEVERAL VIEWS OF THE DRAWINGS

In the following, a preferred embodiment of the present invention will be explained in more detail with reference to the drawings enclosed, in which.

DETAILED DESCRIPTION OF THE INVENTION

Figure 1:
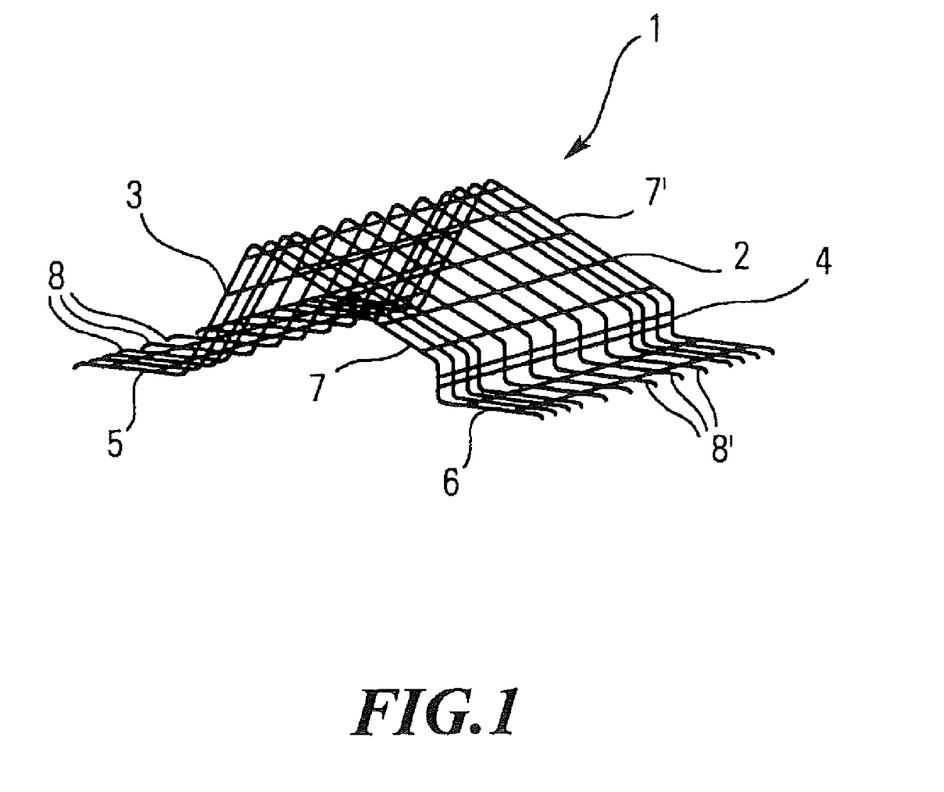
FIG. 1 shows a stackable flat-roof/ground framework for solar panels according to the present invention.

FIG. 1 shows a flat-roof/ground framework for solar panels according to the present invention.

It can clearly be seen that the solar framework is produced from individual wire rods which extend at right angles to one another, the resultant wire grate being angled more than once so as to define the desired shape. In more detail, the flat-roof/ground framework 1 comprises a sloping desk-like supporting region 2. The rear wall 3 and the front wall 4 are angled from the opposed horizontal edges of this supporting region.

Both the rear wall 3 and the front wall 4 are angled at an angle of more than 90° with respect to the supporting region 2. As regards the angled areas it can clearly be seen that the respective areas where the grate is angled are areas in which the wire rods extend only vertically, i.e. the edge is only defined by the bending points of the vertical rods, and the horizontal wire rods are arranged above and below these bending points.

As can additionally be seen in FIG. 1, the horizontal wire rods are much more closely spaced in the area of the front wall than in the residual area of the wire grate, where the horizontal rods are approximately equally spaced. This much narrower distance between the wire rods originates from the shape of the front wall, in particular of the reduced height thereof. If the normal distance were maintained, only one horizontal rod would extend across said front wall. Due to the provision of two closely spaced horizontal rods, an additional stabilization of the front wall is here accomplished.

Accordingly, also the vertical wire rods arranged in the lateral end sections of the wire grate are spaced much more closely than the wire rods in the intermediate central area. A respective wire rod 7, 7' defines the outer lateral edge and the three vertical wire rods which immediately border on this outer edge are arranged such that they are comparatively closely spaced. This narrow spacing serves to improve the stability on the one hand, and to simplify mounting on the other.

The wire grate is angled once more from the rear wall 3 as well as from the front wall 4 so as to define base regions 5, 6 extending outwardly away from each other. The base regions 5, 6 extend in one plane and define simultaneously the supporting area of the framework on the surface onto which the flat-roof/ground framework is to be mounted. Also in this case, the wire grate is angled in an area in which only vertical wire rods extend, the horizontal rods being spaced apart from the bending points to a predetermined extent. This will substantially simplify the bending operation.

The vertical wire rods extend in both base regions 5, 6 beyond the last horizontal wire rod so that the outer edges of the base regions are defined by the end points of the vertical wire rods. The end areas of the individual vertical wire rods are angled downwards, as shown in detail in FIG. 7, and form claw elements 8, 8'. When the flat-roof/ground framework is being mounted, these claw elements 8, 8' engage the substrate, thus fixing the framework to the substrate even before the framework is weighted.

Figure 2:
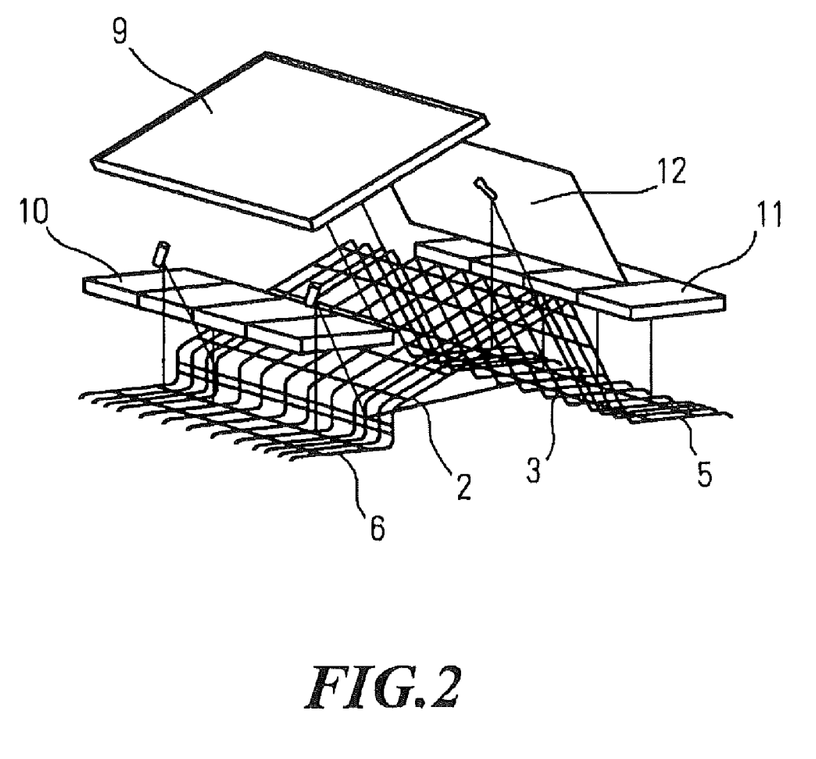
FIG. 2 shows the flat-roof/ground framework according to FIG. 1, the positioning of the weighting elements, of a panel-like stabilizing element for the rear wall, and of the solar panel being shown in said FIG. 2.

FIG. 2 shows the position of the individual elements which can be mounted on the flat-roof/ground framework. Accordingly, the solar panel 9 is arranged in the supporting region 2. In the area of the rear wall 3, a wind deflector 12 can be arranged, and the base regions 5, 6 can have arranged thereon weighting means 10, 11. Suitable weighting means are e.g. pavement plates, gravel and also any other means having the effect that the framework will be fixed on the substrate.

Figure 3:
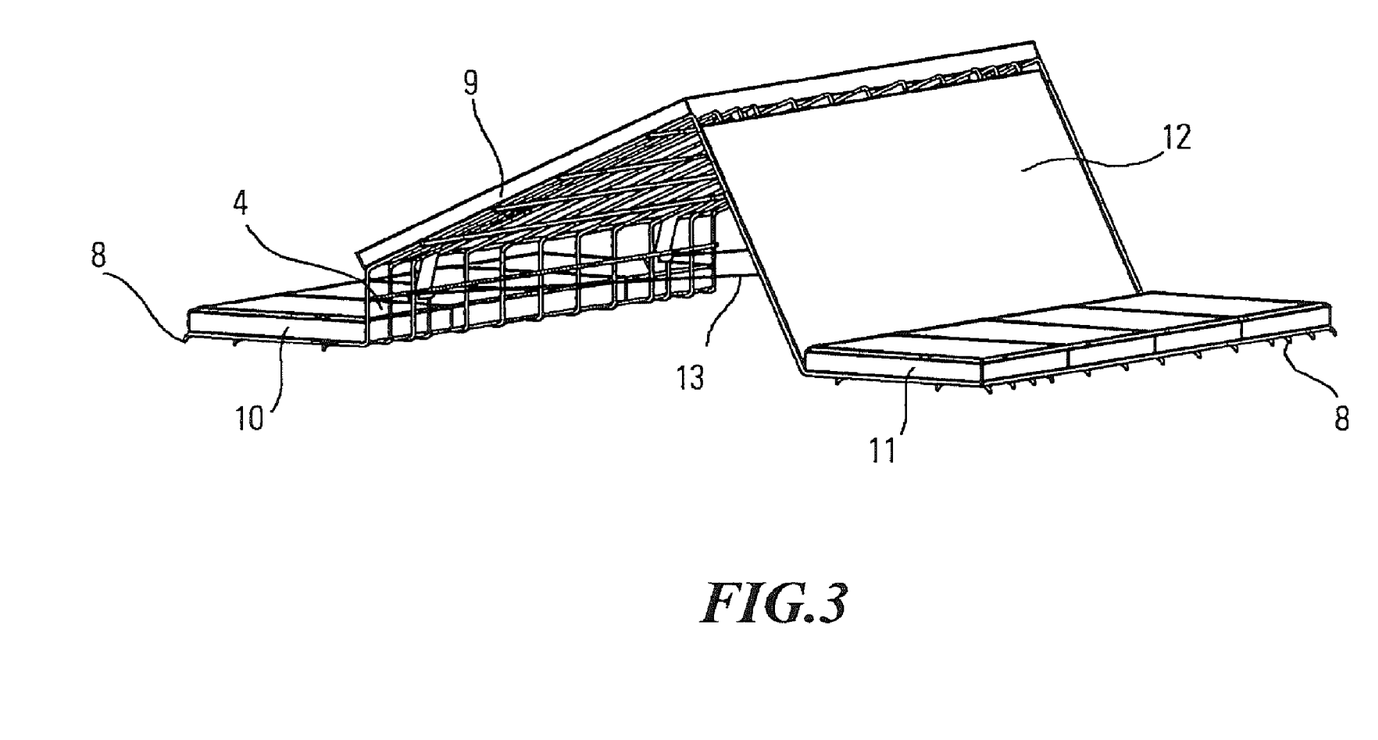
FIG. 3 shows the flat-roof/ground framework according to the present invention having the weighting elements as well as the panel-like stabilizing element arranged thereon.

FIG. 3 shows the flat-roof/ground framework in a partially mounted condition, in which the weighting elements 10, 11 have already been mounted on the base regions 5, 6 and the wind deflector 12 has already been mounted on the rear wall 3 of the framework. FIG. 3 shows also clearly that a connection element 13 is arranged between the rear wall 3 and the front wall 4 on either side, said connection element 13 being a stabilizing member having angled hook elements formed on both ends thereof. The connection element 13 engages the wire grate of the front wall 4 and of the rear wall 3 with these hook elements thus fixing the front wall 4 and the rear wall 3 in spaced relationship with one another.

Figure 4:
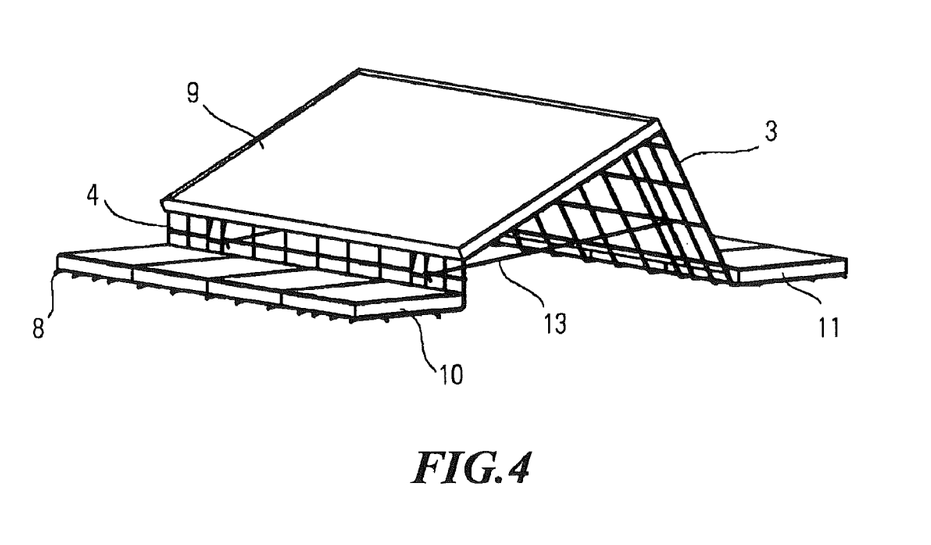
FIG. 4 shows the flat-roof/ground framework according to the present invention having the solar panel mounted thereon.

A flat-roof/ground framework according to the present invention having a solar panel mounted thereon, i.e. a flat-roof/ground framework in a fully mounted condition, is shown in FIG. 4. The solar panel is simply attached to the grate via spring elements 15, 16 and can therefore be arranged easily and removed easily. The use of spring elements allows the number of fasteners to be reduced.

Figure 5:
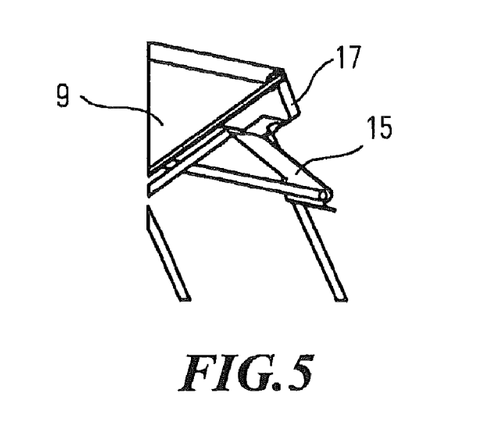
FIG. 5 shows how the solar panel is fixed to the rear wall.
Figure 6:
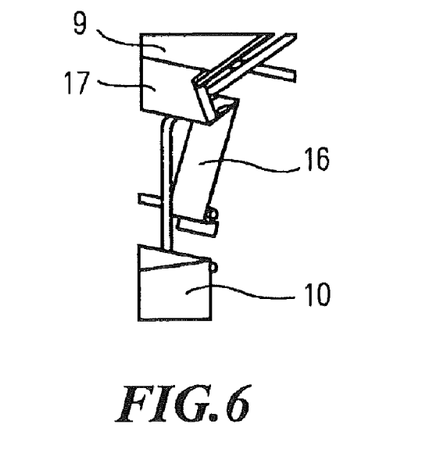
FIG. 6 shows how the solar panel is fixed to the front wall.

The fixing through suitable spring elements is shown in detail in FIGS. 5 and 6. FIG. 5 shows how the solar module is fixed to the upper edge, and FIG. 6 shows how the solar module is fixed to the lower edge.

Each solar module comprises a solar panel provided, on the upper and lower edges, with a rearwardly extending edge element 17 defining a groove-shaped or U-shaped edge at the rear of the solar panel.

The spring elements consist of strip-shaped metal elements, which are each bent at the upper and at the lower edge at an angle of less than 90° so as to provide hook elements. It follows that, when seen in a side view, the spring elements define S-shaped elements. The spring elements 15, 16 are bent at one edge such that a sharp angle is formed, whereas the oppositely defined bending edge is rounded. At the end provided with the rounded hook element, the spring element is angled once more, in a direction opposite to the first bend, so that this end has the shape of a sinuous line.

When the solar panel is in use, the hook element forming the sharp-angled bend is, as can be seen in FIGS. 5 and 6, attached to the edge element 17 of the solar panel and, subsequently, the rounded hook element is attached to one of the horizontal wire rods of the framework. The curvature of the hook element corresponds to the diameter of the wire rods so that a good connection will be established between them. The second element, which is angled from the round-angled bending edge, provides here a handling element used for fixing the spring element to the wire rods and for removing it therefrom.

In view of the fact that the vertical wire rods 7, 7' are more closely spaced in the area of the lateral outer edges, i.e. in the area where fixing of the solar module is effected, the spring elements will be fixed in position by neighbouring wire rods.

Fixing via the respective spring elements can be executed very easily and without the use of any additional tools on site.

Figure 7:
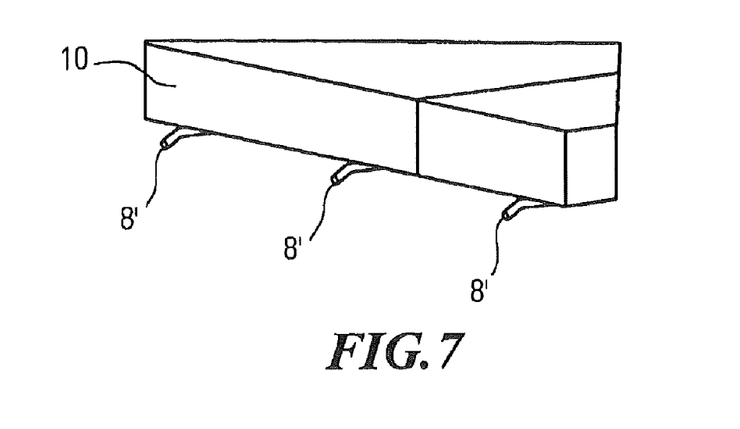
FIG. 7 shows an enlarged fragmentary view of the base regions having the weighting means provided thereon.

Finally, FIG. 7 shows, as has already been mentioned hereinbefore, a weighting element 10 and the underlying base region 6. As regards the base region 6, only the downwardly angled claw elements 8' can be seen, which extend beyond the base region and which, due to the weight of the weighting elements, are additionally forced down into and fixed in the substrate.

Figure 8:
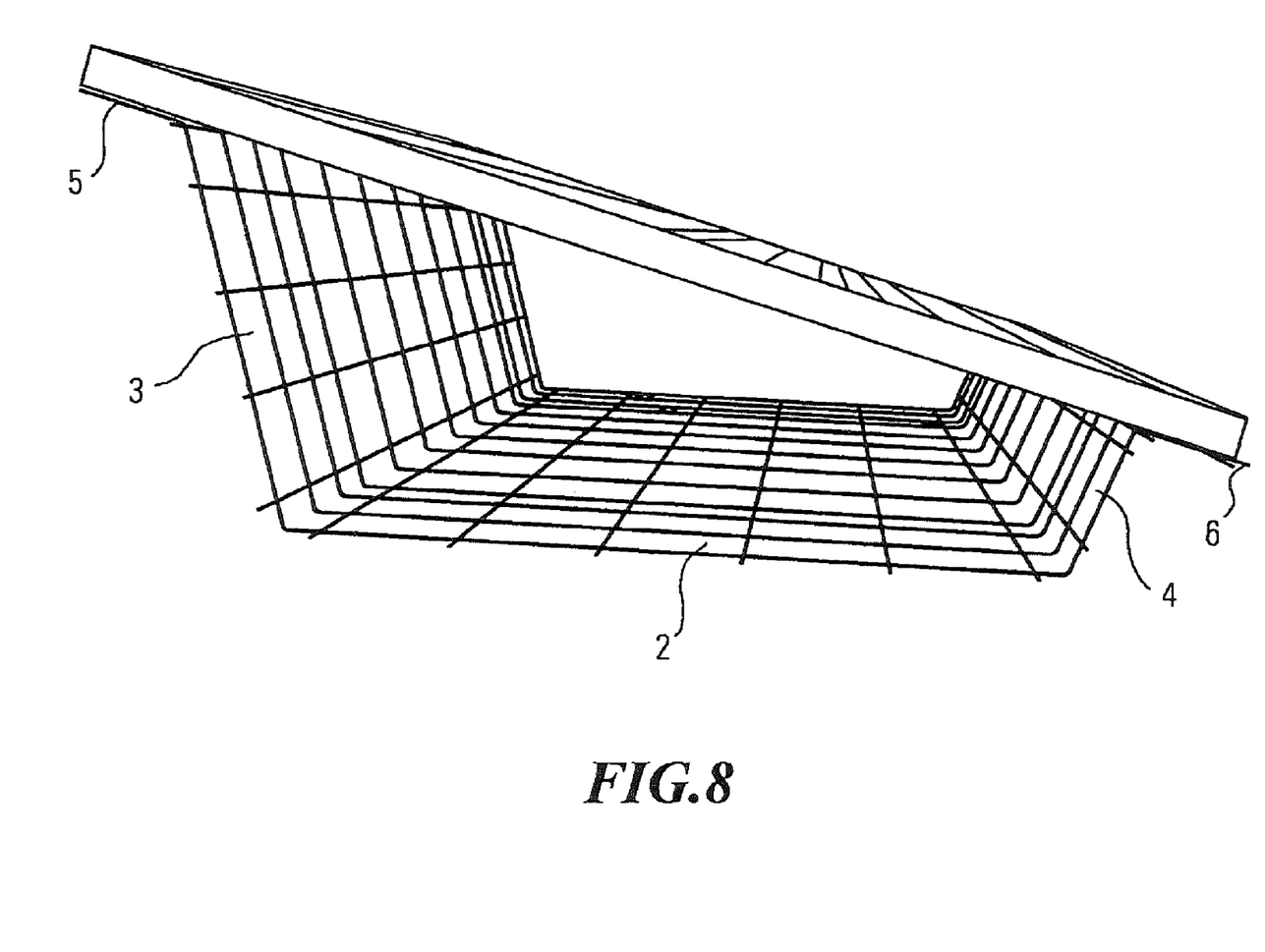
FIG. 8 shows a stackable flat-roof/ground framework for solar panels according to the present invention in accordance with a further embodiment of the present invention.
Figure 9:
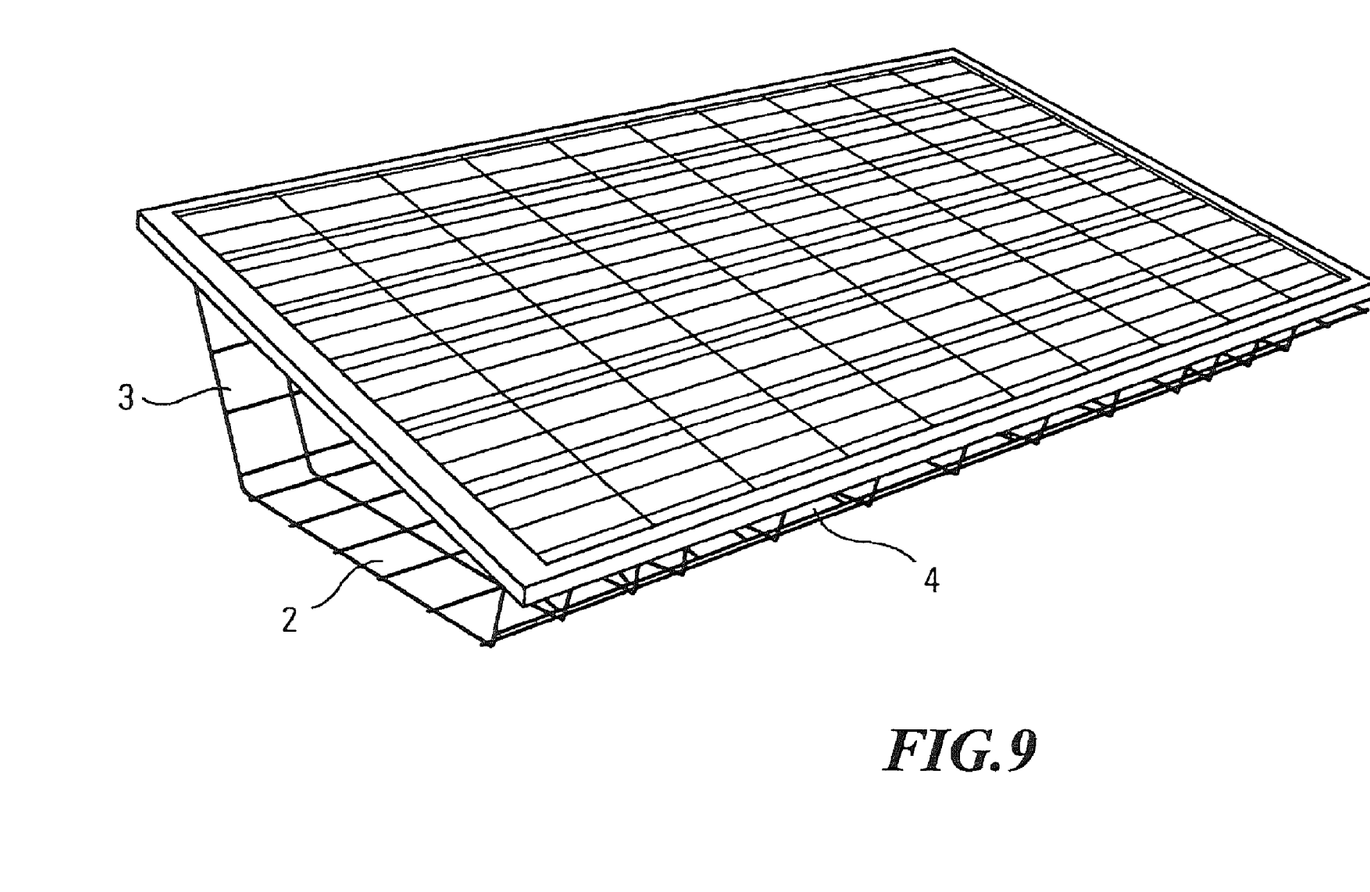
FIG. 9 shows the flat-roof/ground framework according to FIG. 8 seen from a different angle.

Another embodiment of the flat-roof/ground framework for solar panels is shown in FIG. 8. The flat-roof/ground framework has here a structural design which is identical to that of the preceding embodiment according to FIGS. 1 to 4. Other than in the case of the preceding embodiment, the flat-roof/ground framework is, however, arranged upside down, so that the sloping desk-like supporting region 2 now defines the base region, i.e. the region which is arranged in direct contact with the substrate and on which weighting means can be arranged so as to fix the framework. Starting from this base region 2, the rear wall 3 and also the front wall 4 extend from said base region at an angle of more than 90°. Supporting regions 5, 6 are arranged on the front wall edges as well as on the rear wall edges which are located opposite said base region 2, said supporting regions 5, 6 being again formed by bending the wire grate away from the front wall and from the rear wall, respectively. The supporting regions 5, 6 are angled from the front wall 4 and the rear wall 3 in such a way that they extend in one plane and in outward direction, i.e. away from the base region 2. It follows that the solar panel is carried by and fixed on the supporting regions only in an upper section and in a lower section of the solar panel. The supporting regions extend at least up to the outer edge of the solar panel, but, as can be seen in FIG. 9, they may also extend beyond the actual solar panel.

Since the base region 2 is, in this embodiment, smaller than the size of the solar panel, a suitably arranged flat-roof/ground framework can be provided also in areas or on elements in the case of which the available substrate is comparatively small or difficult to access.

What is claimed is:

1. A stackable solar panel framework suitable for use on flat roofs or on the ground, comprising at least one sloping supporting region for the solar panel, said framework being comprised of a wire grate, characterized in that the framework in its entirety is produced by bending the wire grate to form at each of two opposite ends of said at least one supporting region respective elements that extend at an angle from said supporting region, one of said elements defining a rear wall and the other of said elements defining a front wall, the front wall being shorter than the rear wall, both the rear wall and the front wall being disposed on the same side of and angled from the supporting region at an angle of more than 90°, and that at least one weightable panel-like base region is provided, said at least one base region extending at an angle from one or both of the rear wall and the front wall.

2. A stackable solar panel framework according to claim 1, characterized in that the base region extends between the front wall and the rear wall.

3. A stackable solar panel framework according to claim 1, characterized in that the supporting region extends between the front wall and the rear wall.

4. The stackable solar framework according to claim 1, wherein the wire grate consists of individual wire rods which extend at right angles to each other.

5. A stackable solar panel framework according to any one of claims 1, 2, 3 or 4, characterized in that the wire rods are joined by welding at points of intersection of the wire rods.

6. A stackable solar panel framework according to any one of claims 1, 2, 3 or 4, characterized in that the wire rods consist of an aluminum zinc wire.

7. A stackable solar panel framework according to any one of claims 1, 2, 3 or 4 wherein some of the wire rods comprise horizontal wire rods and others of the wire rods comprise vertical wire rods, characterized in that the distances between one or both of the individual horizontal wire rods and the individual vertical wire rods are substantially identical.

8. A stackable solar panel framework according to any one of claims 1, 2 or 3 wherein some of the wire rods comprise horizontal wire rods and others of the wire rods comprise vertical wire rods and wherein the framework has lateral edges, characterized in that the vertical wire rods are more closely spaced to each other in the area of the lateral edges than is the case between the lateral edges.

9. A stackable solar panel framework according to any one of claims 1, 2 or 3 wherein some of the wire rods comprise horizontal wire rods and others of the wire rods comprise vertical wire rods, characterized in that, in the area of the front wall, the horizontal wire rods of the front wall are more closely spaced than the horizontal wires in the area of the rear wall or in the supporting region.

10. A stackable solar panel framework according to any one of claims 1, 2 or 3, characterized in that the framework comprises two base regions, both of which extend in a direction away from the supporting region.

11. A stackable solar panel framework according to claim 10 wherein some of the wire rods comprise horizontal wire rods and others of the wire rods comprise vertical wire rods, characterized in that the end portions of the vertical wire rods are downwardly angled as claw elements.

12. A stackable solar panel framework according to any one of claims 1, 2, 3 or 4, characterized in that the front wall and the rear wall are interconnectable by means of connection elements having a pair of opposite end portions and which are provided with respective engagement elements on both of their opposite end portions.

13. A stackable solar panel framework according to claim 12, characterized in that the connection elements are made of a wire which is provided with hooks or suitably bent at the end portions thereof.

14. A stackable solar panel framework according to any one of claims 1, 2, 3 or 4, characterized in that the rear wall is adapted to be connected to a wind deflector.

15. A stackable solar panel framework according to any one of claims 1, 2, 3 or 4, characterized in that the supporting surface is disposed at an angle of inclination and the angle of inclination is an angle between 15° and 65°.

16. A device comprising the stackable solar panel framework according to any one of claims 1, 2, 3 or 4 in combination with at least one solar panel.

17. A device according to claim 16, characterized in that the solar panel is adapted to be fixed to the framework by spring elements.

18. A device according to claim 17, characterized in that the spring elements are made of an elongate wire strip having formed thereon a respective hook element at its opposed ends on the sides facing away from one another.

19. A device according to claim 17, characterized in that the width of the spring elements corresponds to the distance between two neighbouring vertical wire rods.

20. A device according to claim 16 wherein some of the wire rods comprise horizontal wire rods and others of the wire rods comprise vertical wire rods, characterized in that the solar panel is configured to be fixed to the framework via screws.

21. A stackable solar panel framework according to claim 15 wherein the angle of inclination is an angle between 25° and 30°.

22. The stackable solar framework according to any one of claims 2 or 3, wherein the wire grate consists of individual wire rods which extend at right angles to each other.

* * * * *